United States Patent
Lu et al.

(10) Patent No.: US 12,346,809 B2
(45) Date of Patent: Jul. 1, 2025

(54) METHOD, DEVICE, AND STORAGE MEDIUM FOR DEEP LEARNING BASED DOMAIN ADAPTATION WITH DATA FUSION FOR AERIAL IMAGE DATA ANALYSIS

(71) Applicant: Intelligent Fusion Technology, Inc., Germantown, MD (US)

(72) Inventors: Jingyang Lu, Germantown, MD (US); Erik Blasch, Arlington, VA (US); Roman Ilin, Dayton, OH (US); Hua-mei Chen, Germantown, MD (US); Dan Shen, Germantown, MD (US); Nichole Sullivan, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 920 days.

(21) Appl. No.: 17/480,999

(22) Filed: Sep. 21, 2021

(65) Prior Publication Data
US 2022/0092420 A1    Mar. 24, 2022

Related U.S. Application Data

(60) Provisional application No. 63/081,036, filed on Sep. 21, 2020.

(51) Int. Cl.
*G06N 3/08*    (2023.01)
*G06F 18/214*    (2023.01)
(Continued)

(52) U.S. Cl.
CPC ............. *G06N 3/08* (2013.01); *G06F 18/214* (2023.01); *G06F 18/253* (2023.01); *G06V 20/00* (2022.01)

(58) Field of Classification Search
CPC .......... G06N 3/08; G06N 3/045; G06N 3/047; G06N 3/084; G06N 3/088; G06F 18/214; G06F 18/253; G06V 20/00; G06V 10/82
See application file for complete search history.

(56) References Cited

U.S. PATENT DOCUMENTS 11,210,570 B2 *  12/2021   Shen ......................... G06T 7/80
11,580,405 B2 *   2/2023   Santillán Perez et al. ..................
                                                      G06V 10/82

OTHER PUBLICATIONS

Decision-Level Fusion Method for Emotion Recognition using Multimodal Emotion Recognition Information, Kyu-Seob Song, 2018 15th International Conference on Ubiquitous Robots (UR) Hawaii Convention Center, Hawai'i, USA, Jun. 27-30, 2018 (Year: 2018).*

(Continued)

*Primary Examiner* — Incent Gonzales
*Assistant Examiner* — Michael Cameron Reese
(74) *Attorney, Agent, or Firm* — ANOVA LAW GROUP, PLLC

(57) ABSTRACT

Embodiments of the present disclosure provide a method, a device, and a storage medium for domain adaptation for efficient learning fusion (DAELF). The method includes acquiring data from a plurality of data sources of a plurality of sensors; for each of the plurality of sensors, training an auxiliary classifier generative adversarial network (AC-GAN) by a hardware processor with data from each data source of the plurality of data sources, thereby obtaining a trained feature extraction network and a trained label prediction network for each data source; forming a decision-level fusion network or a feature-level fusion network; and (Continued)

training the decision-level fusion network or the feature-level fusion network with a source-only mode or a generate to adapt (GTA) mode; and applying the trained decision-level fusion network or the trained feature-level fusion network to detect a target of interest.

12 Claims, 7 Drawing Sheets

(51) Int. Cl.
    *G06F 18/25*     (2023.01)
    *G06V 20/00*     (2022.01)

(56) References Cited

OTHER PUBLICATIONS

Generate to Adapt: Aligning Domains using Generative Adversarial Networks, Swami Sankaranarayanan et al., arXiv:1704.01705v4 [cs.CV] Apr. 12, 2018 (Year: 2018).*
Multi-Source Domain Adaptation in the Deep Learning Era, Sicheng Zhao et al., arXiv:2002.12169v1 [cs.LG] Feb. 26, 2020 (Year: 2020).*
Multilevel Features Convolutional Neural Network for Multifocus Image Fusion, Yong Yang et al., IEEE Transactions on Computational Imaging, vol. 5, No. 2, Jun. 2019 (Year: 2019).*
Object Detection in Aerial Images Using Feature Fusion Deep Networks, Hao Long et al., DOI 10.1109/ACCESS.2019.2903422 (Year: 2019).*
Self-Paced Collaborative and Adversarial Network for Unsupervised Domain Adaptation, Weichen Zhang et al., IEEE Transactions on Pattern Analysis and Machine Intelligence, vol. 43, No. 6, Jun. 2021 (Year: 2021).*
Adaptive Region Aggregation Network: Unsupervised Domain Adaptation With Adversarial Training for ECG Delineation, Ming Chen et al., IEEE 978-1-5090-6631-5/20 (Year: 2020).*
Classification of Multisource and Hyperspectral Data Based on Decision Fusion, Jon Atli Benediktsson, IEEE Transactions on Geoscience and Remote Sensing, vol. 37, No. 3, May 1999 (Year: 1999).*
CLDA: an adversarial unsupervised domain adaptation method with classifier-level adaptation, Zhihai He et al., Multimedia Tools and Applications (2020) 79:33973-33991 https://doi.org/10.1007/s11042-020-08877-8 (Year: 2020).*
Domain-Invariant Adversarial Learning for Unsupervised Domain Adaption, Yexun Zhang et al., arXiv:1811.12751v1 [cs. CV] Nov. 30, 2018 (Year: 2018).*
Improved Techniques for Adversarial Discriminative Domain Adaptation, Aaron Chadha, IEEE Transactions on Image Processing, vol. 29, 2020 (Year: 2020).*
Learning a Recurrent Residual Fusion Network for Multimodal Matching, Yu Liu et al., Proceedings of the IEEE International Conference on Computer Vision (ICCV), 2017, pp. 4107-4116 (Year: 2017).*
Multi-source remote sensing data fusion: status and trends, Jixian Zhang, International Journal of Image and Data Fusion, 1:1, 5-24, DOI: 10.1080/19479830903561035 (Year: 2010).*

\* cited by examiner

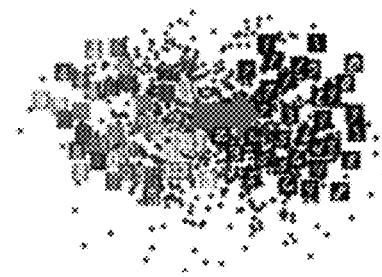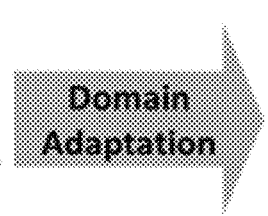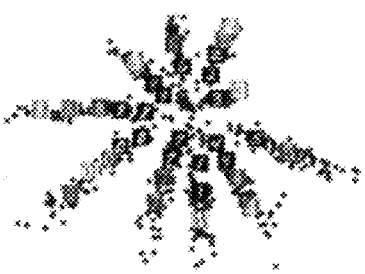
Source Domain   Target Domain
FIG. 3A                                        FIG. 3B
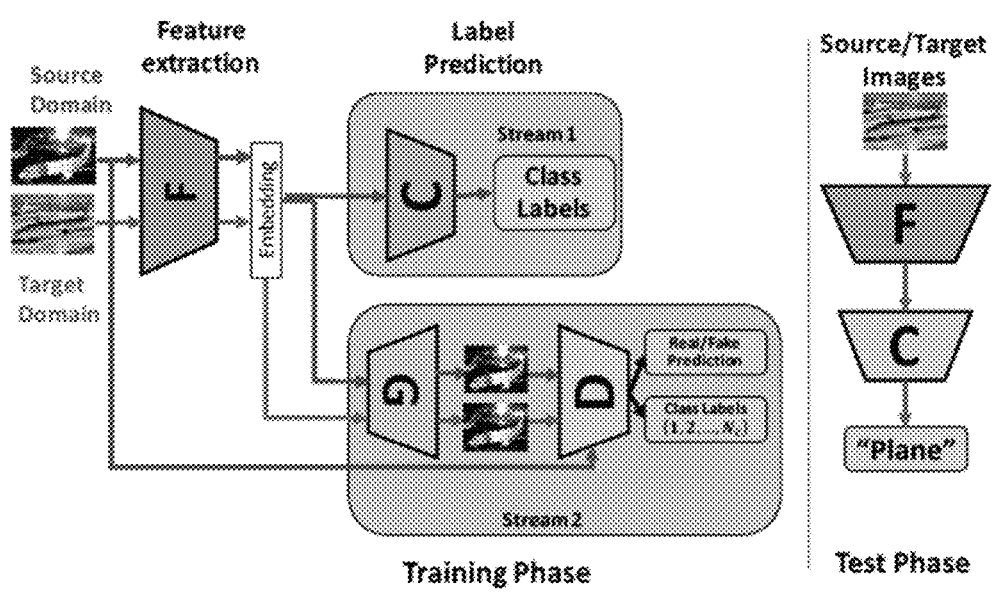
FIG. 4

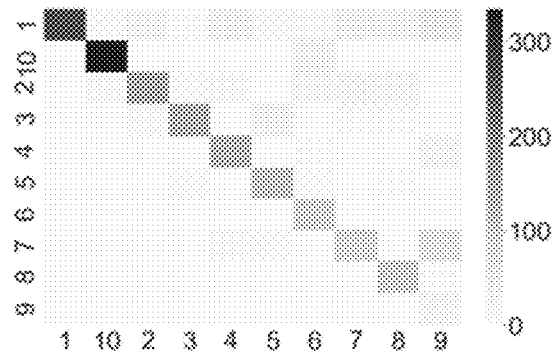
FIG. 8A
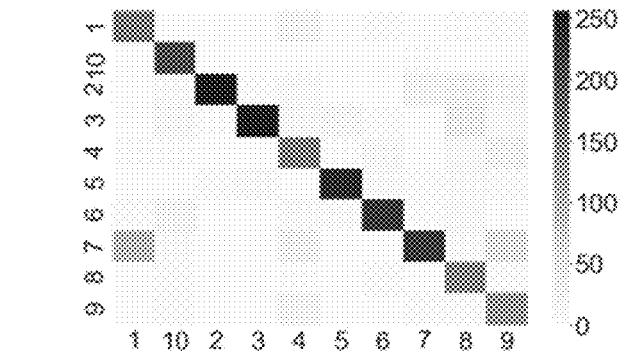
FIG. 8B
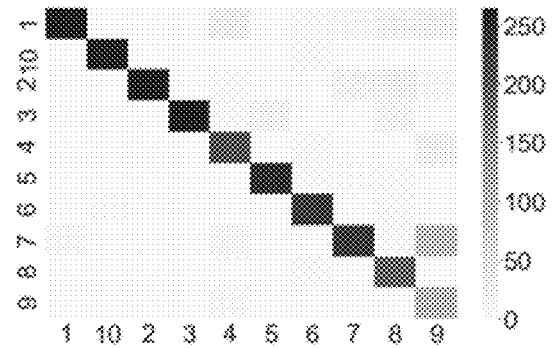
FIG. 8C
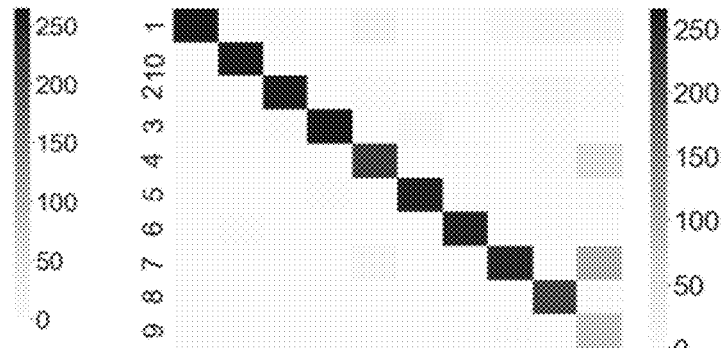
FIG. 8D
FIG. 9A
FIG. 9B

METHOD, DEVICE, AND STORAGE MEDIUM FOR DEEP LEARNING BASED DOMAIN ADAPTATION WITH DATA FUSION FOR AERIAL IMAGE DATA ANALYSIS

CROSS-REFERENCE TO RELATED APPLICATION

This application claims the priority of U.S. Provisional Application No. 63/081,036, filed on Sep. 21, 2020, the content of which is incorporated herein by reference in its entirety.

GOVERNMENT RIGHTS

The present disclosure was made with Government support under Contract No. FA8649-20-P-0350, awarded by the United States Air Force Research Laboratory. The U.S. Government has certain rights in the present disclosure.

FIELD OF THE DISCLOSURE

The present disclosure generally relates to the field of domain adaptation technology and, more particularly, relates to a method, a device, and a storage medium for domain adaptation for efficient learning fusion.

BACKGROUND

Generalizing models learned on one domain to another novel domain has been a major challenge in the quest for universal object recognition, especially for aerial motion imagery. The performance of learned models degrades significantly when testing on novel domains due to the presence of domain shift.

Deep learning, as an element of machine learning (ML), has revolutionized various conventional data fusion approaches including wavelet fusion, manifold fusion, and target tracking. Deep learning has been utilized to uncover rich, hierarchical models that represent probability distributions of various labeled data in different domains such as natural aerial images, audio waveforms containing speech, and symbols in natural language corpora. For a problem lacking labeled data, it may be still possible to obtain training sets that are large enough for training large-scale deep models, but the models suffer from the domain shift in data from the trained data to that of the actual data encountered at the application time.

BRIEF SUMMARY OF THE DISCLOSURE

One aspect or embodiment of the present disclosure provides a domain adaptation for efficient learning fusion (DAELF) method. The method includes acquiring data from a plurality of data sources of a plurality of sensors; for each of the plurality of sensors, training an auxiliary classifier generative adversarial network (AC-GAN) by a hardware processor, where the AC-GAN includes a feature extraction network, a label prediction network, a generator network, and a discriminator network, with data from each data source of the plurality of data sources, thereby obtaining a trained feature extraction network and a trained label prediction network for each data source; using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network; training the decision-level fusion network or the feature-level fusion network with a source-only mode or a generate to adapt (GTA) mode; and applying the trained decision-level fusion network or the trained feature-level fusion network to detect a target of interest.

Another aspect or embodiment of the present disclosure provides a domain adaptation for efficient learning fusion (DAELF) device. The device includes a memory, configured to store program instructions for performing a DAELF method; and a processor, coupled with the memory and, when executing the program instructions, configured for: acquiring data from a plurality of data sources of a plurality of sensors; for each of the plurality of sensors, training an auxiliary classifier generative adversarial network (AC-GAN) by a hardware processor, where the AC-GAN includes a feature extraction network, a label prediction network, a generator network, and a discriminator network, with data from each data source of the plurality of data sources, thereby obtaining a trained feature extraction network and a trained label prediction network for each data source; using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network; training the decision-level fusion network or the feature-level fusion network with a source-only mode or a generate to adapt (GTA) mode; and applying the trained decision-level fusion network or the trained feature-level fusion network to detect a target of interest.

Another aspect or embodiment of the present disclosure provides a non-transitory computer-readable storage medium, containing program instructions for, when being executed by a processor, performing a domain adaptation for efficient learning fusion (DAELF) method, the method including: acquiring data from a plurality of data sources of a plurality of sensors; for each of the plurality of sensors, training an auxiliary classifier generative adversarial network (AC-GAN) by a hardware processor, where the AC-GAN includes a feature extraction network, a label prediction network, a generator network, and a discriminator network, with data from each data source of the plurality of data sources, thereby obtaining a trained feature extraction network and a trained label prediction network for each data source; using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network; training the decision-level fusion network or the feature-level fusion network with a source-only mode or a generate to adapt (GTA) mode; and applying the trained decision-level fusion network or the trained feature-level fusion network to detect a target of interest.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIGS. 3A-3B depict exemplary domain adaptation of samples of a same class from source and target domains;

FIG. 4 depicts an exemplary auxiliary classifier generative adversarial network (AC-GAN) approach according to various disclosed embodiments of the present disclosure;

FIG. 8A depicts exemplary domain adaption performance results of MNIST-N to USPS adaptation according to various disclosed embodiments of the present disclosure;

FIG. 8B depicts exemplary domain adaption performance results of SVHN to MNIST-JP adaptation according to various disclosed embodiments of the present disclosure;

FIG. 8C depicts exemplary domain adaption performance results of decision-level data fusion for multiple sensors according to various disclosed embodiments of the present disclosure;

FIG. 8D depicts exemplary domain adaption performance results of feature-level data fusion for multiple sensors according to various disclosed embodiments of the present disclosure;

FIGS. 9A-9B depict exemplary domain adaptation between aerial image dataset (AID) and the University of California, Merced (UCM) datasets according to various disclosed embodiments of the present disclosure.

DETAILED DESCRIPTION

References may be made in detail to exemplary embodiments of the disclosure, which may be illustrated in the accompanying drawings. Wherever possible, same reference numbers may be used throughout the accompanying drawings to refer to same or similar parts.

Deep learning, as an element of machine learning (ML), has revolutionized various conventional data fusion approaches including wavelet fusion, manifold fusion, and target tracking. Data fusion approaches include data-level, feature-level, and decision-level fusion for applications such as audio-video, video-text, and visual-infrared fusion. The data fusion methods for aerial sensing extend to situation awareness and temporal awareness. The combination of deep learning-based multi-source analysis and data-level fusion provides a self-correcting approach to combine data of different modalities. Cognitively-motivated approaches provide flexibility and robustness of sensory fusion required under partially unknown conditions and in response to unexpected scenarios. Generalizing models learned on one domain to another novel domain has been a major challenge in the quest for universal object recognition, especially for aerial motion imagery. The performance of learned models degrades significantly when testing on novel domains due to the presence of domain shift.

Various embodiments of the present disclosure provide a method, a device, and a storage medium for domain adaptation for efficient learning fusion (DAELF).

Figure 1:
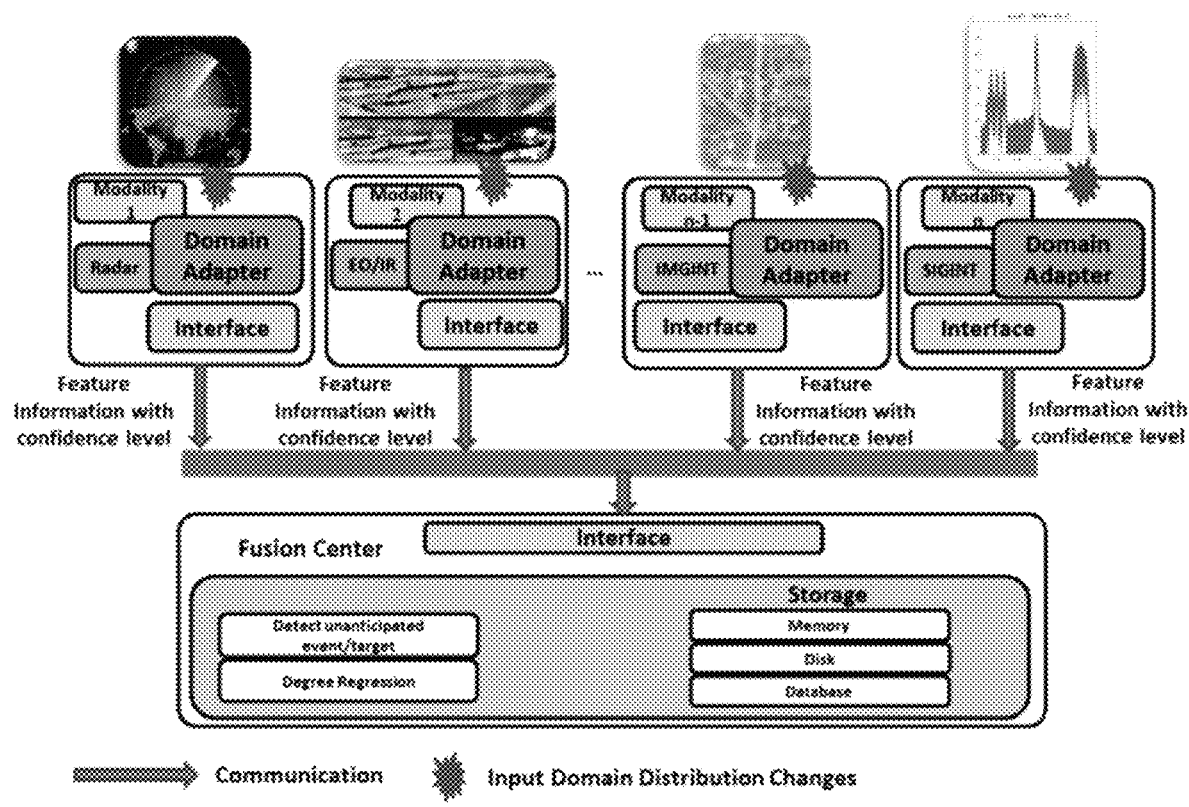
FIG. 1 depicts exemplary domain adaptation for efficient learning fusion (DAELF) according to various disclosed embodiments of the present disclosure.

FIG. 1 depicts exemplary DAELF according to various disclosed embodiments of the present disclosure. Machine learning based domain adaptation for multiple source classification and fusion may be provided in FIG. 1. DAELF may highlight heterogeneous data fusion for unanticipated event/target detection. The data from different sensing modalities may be processed through ML-based domain adapters, which can leverage unsupervised data to bring the source and target distributions closer in a learned joint feature space. DAELF may include a symbiotic relationship between the learned embedding and a generative adversarial network (GAN). It should be noted that the GAN in DAELF may support joint multimodal analysis as contrasted to conventional GAN methods, which use the adversarial framework for generating realistic data and retraining deep models with such synthetic data.

Both machine learning and heterogeneous data-level fusion can enhance detection of unanticipated events/targets through the use of domain adaptation, as shown in FIG. 1. The DAELF deep neural network method (e.g., approach) may adapt to changes of the input distribution allowing self-correcting multiple source classification and fusion. When supported by a scalable distributed computing hierarchy, DAELF may scale up in neural network size, scale out in geographical span, and scale across modalities.

Based on the single source unsupervised domain adaptation (UDA), DAELF may be a new approach to align multiple source domains with the target domain, which incorporates the moment catching component (MC) with GANs into deep neural network (DNN) to train the model in an end-to-end fashion. The key advantages of the DAELF method may be described hereinafter.

Features that combine discriminativeness and domain-invariance achieved may be learned by jointly optimizing underlying features and two discriminative classifiers operating on these features. Namely, two discriminative classifiers may include a label classifier (e.g., predictor) that predicts class labels and is used both during training and test time, and include a domain classifier that discriminates between source and target domains during training.

Classifiers may be adapted to the target domain with different distributions without retraining new input data. The DAELF method may leverage unsupervised data to bring the source and target domain distributions closer in a learned joint feature space.

An adversarial data generation approach may be leveraged to directly learn the shared embedding features using labeled data from the source domain and unlabeled data from the target domain. The novelty of the DAELF method may be in using a joint generative discriminative method;

that is, the embeddings may be learned using a combination of classification loss and data generation procedure that is modeled using a variant of GANs. Given availability of multiple data sources, the DAELF method may aim to transfer knowledge learned from multiple labeled source domains to an unlabeled target domain by dynamically aligning moments of their feature distribution. Decision-level and feature-level fusion may be incorporated for enhanced target/event detection robust performance.

Deep learning has been utilized to uncover rich, hierarchical models that represent probability distributions of various labeled data in different domains such as natural aerial images, audio waveforms containing speech, and symbols in natural language corpora. For a problem lacking labeled data, it may be still possible to obtain training sets that are large enough for training large-scale deep models, but these models suffer from the domain shift in data from the trained data to that of the actual data encountered at the application time.

To account for domain shift, methods may be needed to learn features that combine discriminativeness and domain-invariance in order to address environmental changes. While the parameters of the classifier are optimized in order to minimize errors on the training set, the parameters of underlying deep feature mapping may be optimized in order to minimize the loss of the label classifier and to maximize the loss of the domain classifier. The label classifier may update works adversarially to the domain classifier, and encourage domain-invariant features to emerge in the course of the optimization.

Figure 2:
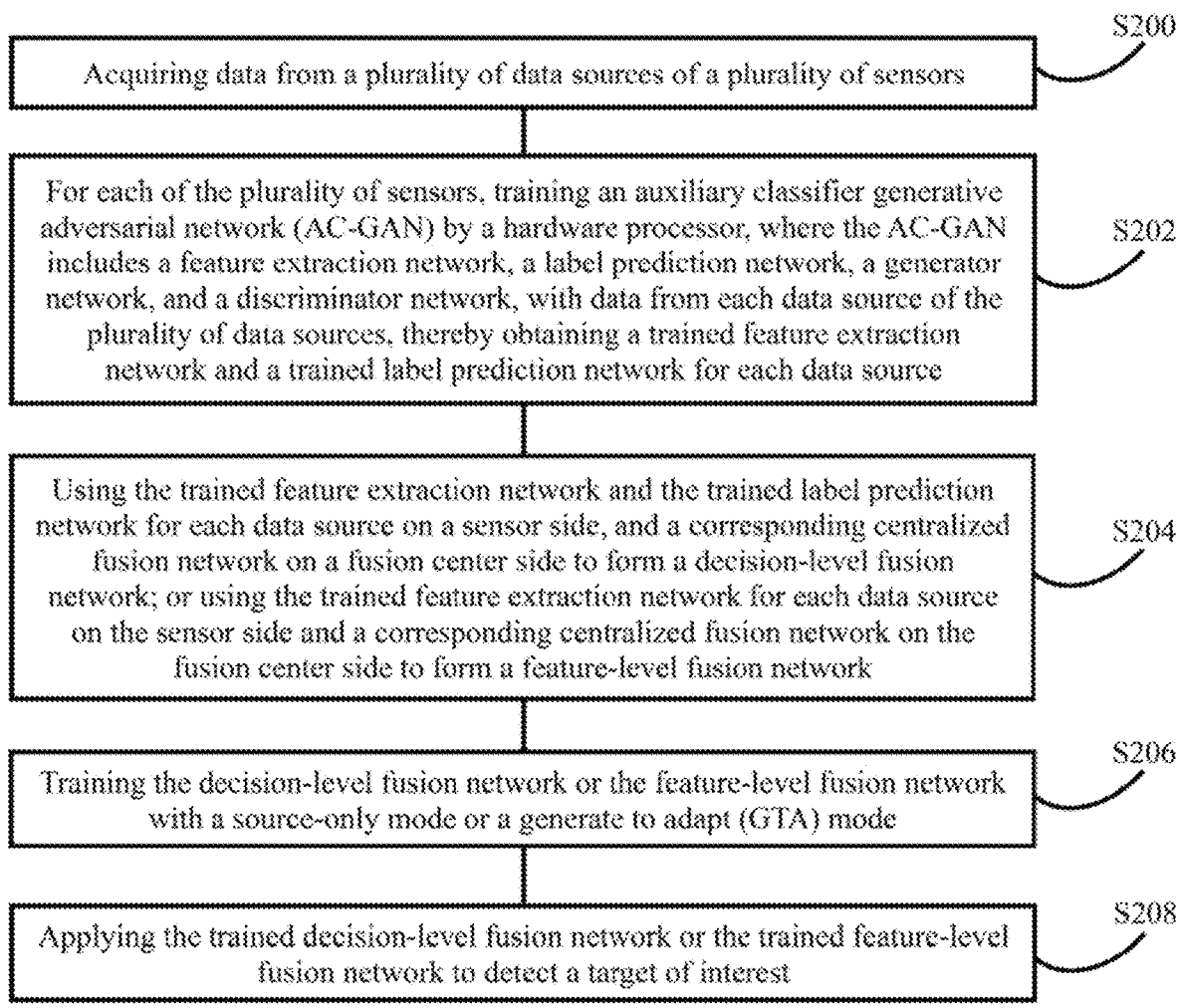
FIG. 2 depicts a flowchart of an exemplary domain adaptation for efficient learning fusion (DAELF) method according to various disclosed embodiments of the present disclosure.

FIG. 2 depicts a flowchart of an exemplary DAELF method according to various disclosed embodiments of the present disclosure. According to various embodiments of the present disclosure, the DAELF method may include the following steps.

In S200, data from a plurality of data sources of a plurality of sensors is acquired.

In S202, for each of the plurality of sensors, an auxiliary classifier generative adversarial network (AC-GAN) includes a feature extraction network, a label prediction network, a generator network, and a discriminator network; and the AC-GAN is trained by a hardware processor with data from each data source of the plurality of data sources, thereby obtaining a trained feature extraction network and a trained label prediction network for each data source.

In S204, the trained feature extraction network and the trained label prediction network for each data source on a sensor side, and a corresponding centralized fusion network on a fusion center (e.g., as shown in FIG. 1) side are used to form a decision-level fusion network; or the trained feature extraction network for each data source on the sensor side and a corresponding centralized fusion network on the fusion center side are used to form a feature-level fusion network.

In S206, the decision-level fusion network or the feature-level fusion network is trained with a source-only mode or a generate to adapt (GTA) mode.

In S208, the trained decision-level fusion network or the trained feature-level fusion network is applied to detect a target of interest.

In one embodiment, training the AC-GAN includes: inputting a source sample of the data from each data source into the feature extraction network for each data source to generate an embedding feature used by both the label prediction network and the generator network for each data source; and inputting a target sample of the data from each data source into the feature extract network for each data source to generate an embedding feature only used by the generator network for each data source.

In one embodiment, at the source-only mode, the trained feature extraction network for each data source and the corresponding centralized fusion network are trained with labeled source data; and at the GTA mode, the trained feature extraction network for each data source and the corresponding centralized fusion network are trained separately, where the trained feature extraction network for each data source is trained with the labeled source data and unlabeled target data; and the corresponding centralized fusion network is trained with the labeled source data only.

In one embodiment, at a training phase, for each data source, the AC-GAN has a stream 1, including the feature extraction network and the label prediction network, and a stream 2, including the feature extraction network, the generator network, and the discriminator network.

In one embodiment, the method further includes displaying the target of interest detected by the trained decision-level fusion network or the trained feature-level fusion network.

For tasks in data analysis, $X=\{x_i\}_{i=1}^{N}$ is an input space, and $Y=\{y_i\}_{i=1}^{N}$ is a label space. It may be assumed that there exists a source-domain distribution $S(x, y)$ and target-domain distribution $J(x, y)$ over samples in X. There are three types of domain adaptation shown in Table 1.

TABLE 1

|  | Source and target domain | Source and target tasks |
| --- | --- | --- |
| Inductive Domain Adaptation | same | different but related |
| Transductive Domain Adaptation | different but related | same |
| Unsupervised Domain Adaptation | different but related | different but related |

For unsupervised domain adaptation, the source distribution using labeled data from X is only accessible for the machine model training. The problem of unsupervised domain adaptation (as shown in FIGS. 3A-3B) can be stated as learning a classifier (e.g., predictor) that is optimal in the joint distribution space by using labeled source domain data and unlabeled target domain data sampled from X. FIGS. 3A-3B depict exemplary domain adaptation of samples of a same class from source and target domains which are separated (FIG. 3A) and close to each other (FIG. 3B). The objective is to learn an embedding map $$F:X \to \mathbb{R}^d$$

and a prediction function $$C:\mathbb{R}^d \to Y.$$

In DAELF, both F and C are modeled as deep neural networks. The classifier (e.g., predictor) has access to the labels only for the data sampled from source domain and not from the target domain during the training process, so that F implicitly learns the domain shift between the source-domain distribution $S(x, y)$ and the target-domain distribution $J(x, y)$. Likewise, a GAN-based method may be used to bridge the gap between the source and target domains. The target can be accomplished by using both generative and discriminative process which takes as much information as possible to learn the invariant features existing between the source and target domains.

GANs are utilized in various machine learning methods in domain adaptation. In a conventional GAN, two competing mappings, including a discriminator D and a generator G, are learned, and both of which are modeled as deep neural networks. G and D play the minmax game, where D tries to classify generated samples as fake and G tries to fool D by producing examples that are as realistic as possible. In order to train the GAN, the following optimization problem is solved in an iterative manner:

$$\min_G \max_D V(D, G) = E_{x \sim p_{data}}[\log D(x)] + E_{z \sim p_{noise}}[\log(1 - D(G(z))] \quad (1)$$

where $D(x)$ denotes the probability that x comes from the real data distribution rather than the distribution modeled by the generator $G(z)$, and z denotes noise variables. As an extension to conventional GANs, conditional GANs enable conditioning the generator and discriminator mappings on additional data such as a class label or an embedding. Conditional GANs have been shown to generate data on the class label or the embedding respectively. As in training a conventional GAN, the conditional GAN involves optimizing the following minimax objective, conditioned on the variable y:

$$\min_G \max_D E_{x \sim p_{data}}(\log(D(x \mid y))) + E_{z \sim p_{noise}} \log(1 - D(G(z \mid y))) \quad (2)$$

Building on the development of conventional GANs, conditional GANs, and multi-modal GANs, a domain adaptation method using GANs are described hereinafter.

According to various embodiments of the present disclosure, the DAELF method is designed by employing a variant of the conditional GAN which is called auxiliary classifier GAN (AC-GAN), where the discriminator is modeled as a multi-class classifier instead of providing conditioning information at the input, as shown in FIG. 4. FIG. 4 depicts an exemplary DAELF AC-GAN approach according to various disclosed embodiments of the present disclosure. Referring to FIG. 4, "F" denotes an feature extraction network, "C" denotes a label prediction network, "G" denotes a generator network, and "D" denotes a discriminator network. The AC-GAN set up for the domain adaptation is described as the following.

For AC-GAN sampling provided in some embodiments of the present disclosure, given a real data set x as input to F, the input to the generator network G may be $x_g = [F(x), z, l]$, which is a concatenated version of the encoder embedding $F(x)$, a random noise vector $z \in Rd$ may be sampled from $N(0,1)$ and a one-hot encoding of the class label may be $l \in \{0,1\}^{(N_c+1)}$ with Nc real classes and $\{N_c+1\}$ being the fake class. For all target samples, since the class labels are unknown, l may be set as the one-hot encoding of the fake class $\{N_c+1\}$.

For the classifier provided in some embodiments of the present disclosure, a classifier network C may take as input the embedding generated by F and predict a multiclass distribution $C(x)$ (i.e. the class probability distribution of the input x), which is modeled as a $N_c$-way classifier.

For the discriminator provided in some embodiments of the present disclosure, a discriminator mapping D may take the real input data x or the generated input $G(x_g)$ as input and output two distributions: (1) $D_{data}(x)$ the probability of the input being real, which is modeled as a binary classifier, and (2) $D_{cls}(x)$ the class probability distribution of the input x, which is modeled as a $N_c$-way classifier. To clarify the notation, $D_{cls}(x)_y$ implies the probability assigned by the classifier mapping $D_{cls}$ from input x to y. It should be noted that, for target domain data, since class labels are unknown, only $D_{data}$ may be used to backpropagate the gradients. It is worth mentioning that, in order to better improve the training performance, the target domain data may also be used to update the generator (G), which is denoted as follows, $$L_G = \min_G E_{x \sim S} - \log(D_{cls}(G(x_g))_y) + \quad (3)$$

$$\log(1 - D_{data}(G(x_g))) + \log(1 - D_{data}(G(h_{g_i})))$$

According to various embodiments of the present disclosure, fusion network approaches (e.g., models) are described hereinafter.

Figure 5:
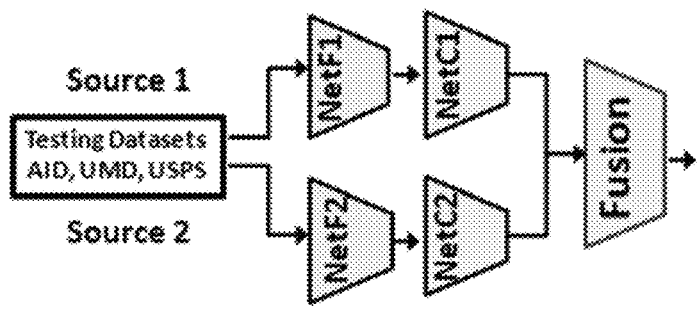
FIG. 5 depicts exemplary decision-level fusion for multiple sensors according to various disclosed embodiments of the present disclosure.

A fusion network model may integrate two sources of input. For clarity, netF (i.e., netF1 or netF2) and netC (i.e., netC1 or netC2) are equivalent to F and C denoted in FIG. 4. Each sensor may have a domain adaptation network (netF) followed by a centralized fusion network in FIG. 5. FIG. 5 depicts exemplary decision-level fusion for multiple sensors according to various disclosed embodiments of the present disclosure. Each netF may be first trained by a different pair from the source/target dataset. In one embodiment, two pair datasets MNIST→USPS and SVHN→IP may be used to demonstrate the validity of the DAELF sensor fusion provided in the present disclosure. The weights of the two netFs may be then brought into the centralized fusion network and the netC may be trained by using two source datasets. Two networks {netF and netC} may be trained and the whole fusion network may be able to predict both target domain inputs.

Figure 6:
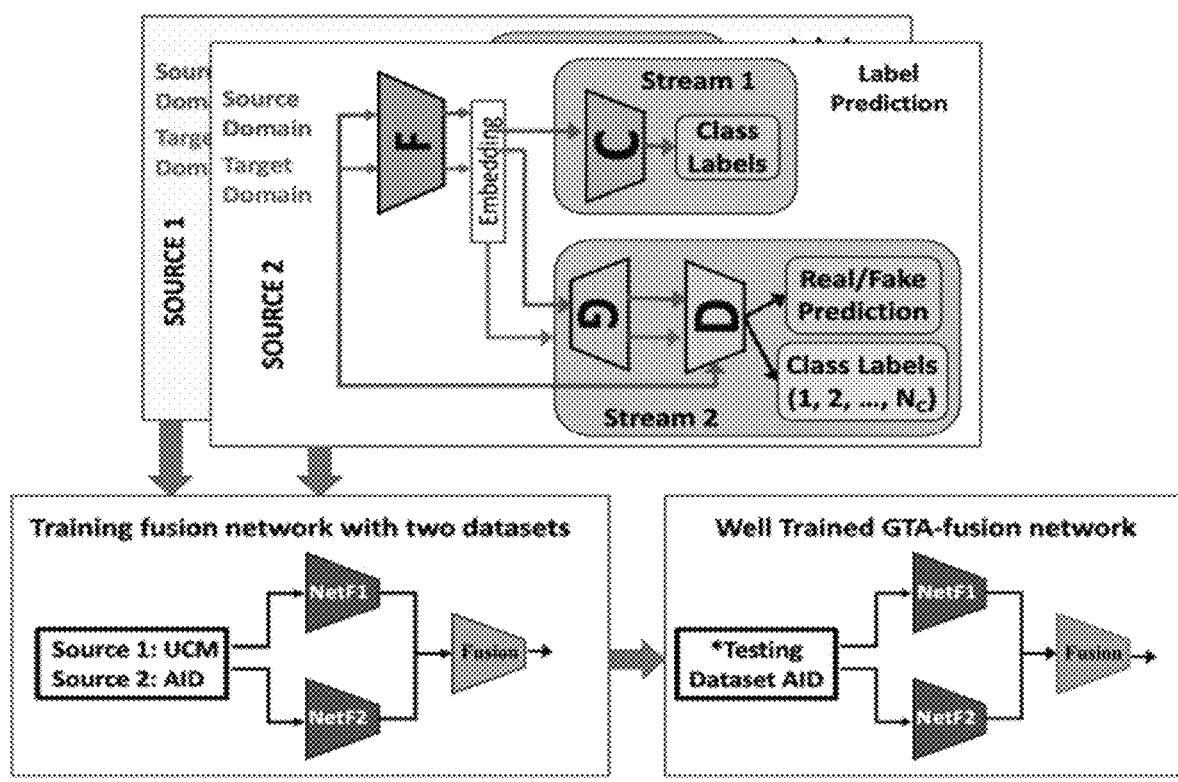
FIG. 6 depicts exemplary feature-level fusion for multiple sensors according to various disclosed embodiments of the present disclosure.

Two fusion approaches widely used are decision-level fusion (DLF) shown in FIG. 5 and feature-level fusion (FLF) shown in FIG. 6. FIG. 6 depicts exemplary feature-level fusion for multiple sensors according to various disclosed embodiments of the present disclosure. The FLF may include two separately trained feature networks (netF1 and netF2) followed by one decision network that takes the concatenation of the outputs of the two feature networks (i.e., two embedding feature vectors) as inputs. The decision network may need to be trained by two source domain training datasets with matched class labels.

Compared with FLF, DLF may not need a second training. DLF may include two classification networks, where each network is formed by the feature network (netF) and the decision network (fusion or netCF) that are trained by the generate to adapt (GTA) mode using one pair of source/target domain data. DAELF may employ a strategy to predict the input images' class label according to outputs of such two feature networks, which is described hereinafter.

The last layer of each netC may have 10 outputs that represent the class labels of 10 digits from 0 to 9. A class label d described in equation (4) may be predicted if a corresponding output value is the maximum of 10 outputs. In order to make a final prediction D from predictions of such two feature networks, DAELF may assess each prediction's reliability by computing an entropy H using equation (5), where p0 through p9 are 10 output values from one netC. The final prediction may be the one that has a smaller entropy according to equation (6). Equations (4), (5) and (6) are defined by:

$$d = \mathrm{argmax}(p_i, i = 0, 1, \ldots, 9) \quad (4)$$

$$H = -\sum_{i=0}^{9} p_i \log(p_i) \quad (5)$$

$$D = \begin{cases} d_1 & \text{if } H_1 < H_2 \\ d_2 & \text{if } H_2 < H_1 \end{cases} \quad (6)$$

DAELF may use two separately trained neural networks to form a fusion network to simulate a two-sensor two-modality system (as shown in FIG. 6). Since there are two sensors used to detect a same object, then it is required that every two images feeding to the fusion network must have an identical class label, which is also the true output of the network.

According to various embodiments of the present disclosure, the DAELF method (e.g., approach) for different scenarios is described hereinafter.

Classification of digit datasets is described according to some embodiments of the present disclosure. Comparing to other standard image datasets, three DIGITS datasets, including USPS (U.S. POSTAL SERVICE), MNIST (Modified National Institute of Standards and Technology database), and SVHN (Google Street View House Number) may be simple, and the domain shift from one to the other may be relatively small. The datasets are widely used as the first set of data in the testing of various domain adaptation approaches. There are two modes in training a network to classify images of handwriting digits:
1) a source-only mode that trains a network (formed by netF and fusion (i.e., netCF)) with labeled source training data only; and
2) a generate to adapt (GTA) mode that trains netF and fusion (i.e., netCF) separately, where NetF may be trained by labeled source training data and unlabeled target training data through a GAN, while netC may be trained by source training data only.

In one embodiment, a target testing dataset may be used to evaluate the performance of the network (netF plus netC) trained by the two different ways. Various datasets may exist for comparison, for example, MNIST, USPS, and SVHN. Table 2 compares the classification result accuracies obtained using the source-only mode. In all three domain adaptation cases, the network trained by GTA may significantly outperform the network trained by the source-only mode. Through inspecting the clustering of embedding features, it is found that it is possible to achieve an accuracy as high as about 96% if the model selection strategy can be modified.

TABLE 2

|  | MNIST→USPS | USPS→MNIST | SVHN→MNIST |
|---|---|---|---|
| Source-only | 79.1 ± 0.9 | 57.1 ± 1.7 | 60.3 ± 1.5 |
| GTA | 95.3 ± 0.7 | 90.8 ± 1.3 | 92.4 ± 0.9 |

Visualization and potential improvement of embedding features is described according to some embodiments of the present disclosure. DAELF may employ a T-distributed stochastic neighbor embedding (TSNE) method to visualize the embedding features produced by netF. TSNE is a widely-used feature reduction and visualization method that transfers samples in a high-dimensional space to a low-dimensional space while retaining their relative distribution in the original space. Therefore, a cluster of samples on a 2D graph may indicate a similar cluster of these samples in their original high dimensional space.

Figure 7A:
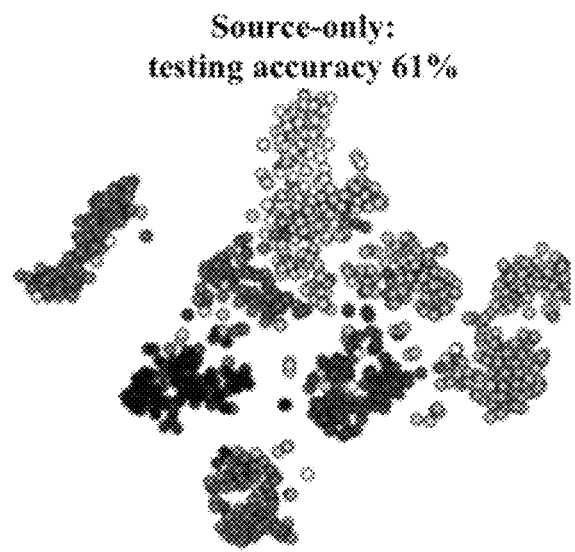
FIGS. 7A-7D depict exemplary 2-D views of embedding features according to various disclosed embodiments of the present disclosure.
Figure 7B:
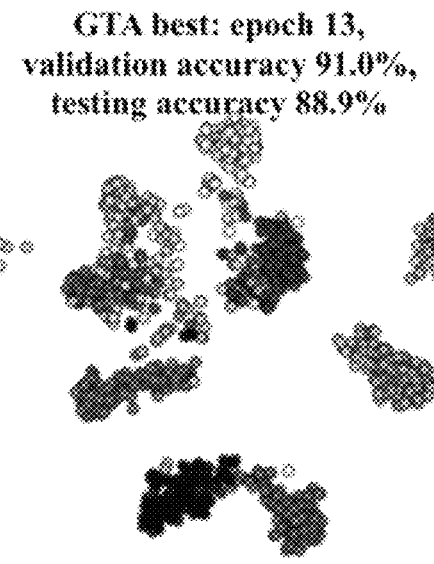
Figure 7C:
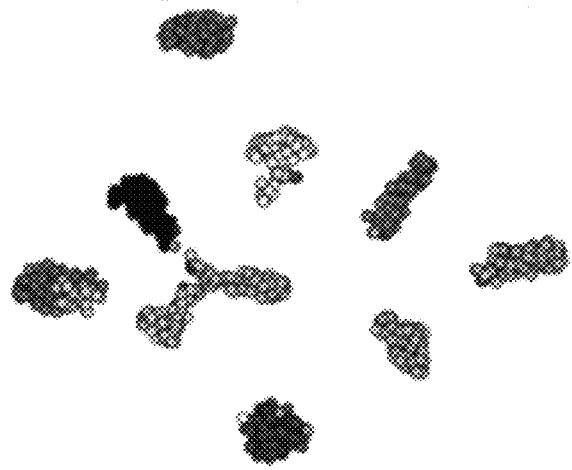
Figure 7D:
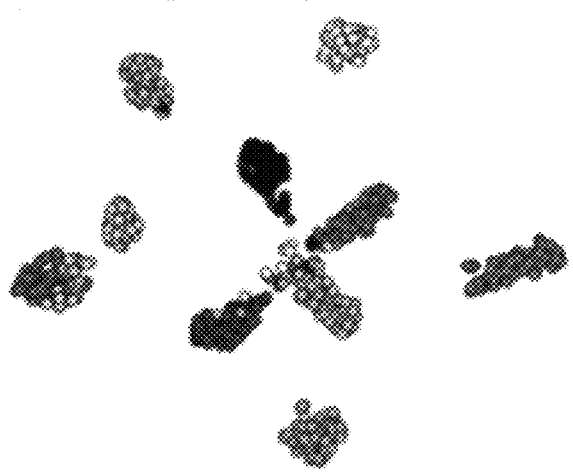

By visually inspecting the distribution of target samples' embedding features (128 dimensions) that are mapped onto a 2D graph via the TSNE method, the results may be desirable. FIGS. 7A-7D depict exemplary 2-D views of embedding features according to various disclosed embodiments of the present disclosure. FIGS. 7A-7D shows the 2D maps of embedding features for MNIST testing data generated by netF that are trained by SVHN as source training data (FIG. 7A, the source-only mode), and by SVHN as source training data and MNIST as target training data (FIGS. 7B-7D, the GTA mode).

Comparing embedding features obtained through GTA and source-only training, GTA features may better separate testing images of 10 digits into distinct clusters, which leads to a significantly improvement of classification accuracy for target testing data from about 61% to about 88%. The best GTA mode when maximal validation accuracy is reached may be shown in FIG. 7B. It should be noted that DAELF may not obtain the best performance from the GTA trained netF that is selected when the validation accuracy reached maximum at epoch 13. On the contrary, DAELF may obtain significantly higher testing accuracy for netF selected after more training iterations, for example at epoch 51, epoch 76. At these times, the validation accuracy (on source data) may be slightly decreased from about 91.0% to about 89.8% and 90.4%. However, the testing accuracy may increase from about 88.9% to about 97.0% and 96.4%. Correspondingly, the clusters of the testing images of 10 digits may be more clearly separated on the 2D graphs by the embedding features from netF selected later at epochs 51 and 76 (as shown in FIGS. 7C-7D).

The visualization results demonstrates that the validation accuracy measured on source domain data may not be the ideal metric for selecting the optional model (netF) to classify target domain data. Since domain adaptation is driven by both source and target domain data during GTA mode training, a model's performance on source domain may be a trade-off to its performance on the target domain. Therefore, the model selection solely based on its best performance on the source domain data may be sub-optimal for the target domain data. An optimal model selection strategy should balance the performance on both domains.

A model's performance on target domain cannot be directly estimated without knowing target sample labels. In such case, a surrogate metric may be needed to indirectly estimate a model's potential performance on the target domain. One of such surrogate metrics could be based on the clustering of target domain data in the embedding feature space as its correlation with target domain performance has been shown in FIGS. 7A-7D. To achieve correlation without knowing the labels of target samples, it is possible to rely on labeled source training samples to determine the clustered regions in the embedding feature space and quantify how well target training samples may fall into those dense regions.

Data fusion for multiple sensors is described according to some embodiments of the present disclosure. In one embodiment, four DIGIT datasets may be used to simulate two sensor modalities. The four datasets may include two datasets (SVHN and USPS) and two new datasets (MNIST-N (noise) and MNIST-JP (Japanese)). MNIST-N may include images derived from MNIST by adding background noise. MNIST-JP may include a dataset similar to MNIST but the images of hand writing digits are written by Japanese. These two new datasets may be used in order to increase learning difficulty so that the performance improvement of the fusion approaches could be observed.

In one embodiment, four datasets may be separated into two pairs and GTA may be applied to train two separate neural networks. The first neural network may be trained by using SVHN as source domain data and MNIST-JP as target domain data (SVHN→MNIST-JP). The second neural network may be trained by using MNIST-N as source domain data and USPS as target domain data (MNIST-N→USPS). The two networks may be evaluated by testing data from the target domain, for example, MNIST-JP and USPS, respectively.

The performances of the feature-level and the decision-level fusion approaches may be evaluated and compared with single GTA-trained networks. Table 3 lists the classification accuracy when each approach is used to predict testing datasets which are not used in any training processes.

TABLE 3

| Testing Dataset | Single GTA-trained network | | FLF | DLF |
|---|---|---|---|---|
| | MNIST-M→USPS | SVHN→MNIST-JP | | |
| USPS | 71.90 | 58.44 | | |
| MNIST-JP | 56.89 | 74.37 | | |
| USPS + MNIST-JP | | | 86.07 | 84.28 |

FIG. 8A depicts exemplary domain adaption performance results of MNIST-N to USPS adaptation according to various disclosed embodiments of the present disclosure; FIG. 8B depicts exemplary domain adaption performance results of SVHN to MNIST-JP adaptation according to various disclosed embodiments of the present disclosure; FIG. 8C depicts exemplary domain adaption performance results of decision-level data fusion for multiple sensors according to various disclosed embodiments of the present disclosure; and FIG. 8D depicts exemplary domain adaption performance results of feature-level data fusion for multiple sensors according to various disclosed embodiments of the present disclosure. The GTA-trained network may effectively improve the classification accuracy for target domain data. DAELF may show improvement again in each single GTA trained network. The network trained by MNIST-N→USPS may achieve about 71.9% (FIG. 8A) accuracy for USPS testing data, and the network trained by SVHN→MNIST-JP may achieve about 74.37% (8B) accuracy for MNIST-JP testing data. However, the two networks may not perform well for new domain data. The former network may only achieve about 56.89% accuracy for MNIST-JP, and the latter network achieve about 58.44% accuracy for USPS.

After incorporating the two networks together, either through feature-level or decision-level fusion, the new system may outperform any single network for any one of the two testing datasets. The two fusion approaches may achieve accuracy of about 84.28% (FIG. 8C) and about 86.07% (FIG. 8D), respectively. Such more than 10% increase may demonstrate the effectiveness of the fusion approach provided in various embodiments of the present disclosure.

Classification of aerial image dataset is described according to some embodiments of the present disclosure. Aerial imagery analysis may provide a desirable showcase for advances in deep learning. The DAELF method (e.g., model) may be modified to enable the classification of aerial images. In one embodiment, two datasets, including aerial image dataset (AID) and the University of California, Merced (UCM) dataset, may be chosen as source and target domain datasets, respectively. AID is a new large-scale aerial image dataset that collected images from the Google Earth imagery. The dataset may contain 10000 600×600-pixel land images that are categorized in 30 scenes. The UCM is a similar land image dataset, which may contain 2100 256×256-pixel images that are categorized in 21 scenes (100 images per scene). The images may be manually extracted from large images from the USGS National Map Urban Area Imagery collection for various urban areas around the country. In order to test the DAELF model, five classes of images may be only used from each dataset in the model development. These classes may include baseball field, medium residential area, sparse residential area, beach, and parking lot. 70% of images may be randomly chosen from AID and UCM to form source and target training datasets and the remaining images may be used as testing datasets. FIGS. 9A-9B depict exemplary domain adaptation between AID and UCM datasets according to various disclosed embodiments of the present disclosure. The source domain (images in the AID dataset) may be shown in FIG. 9A, and the target domain (images in the UCM dataset) may be shown in FIG. 9B.

Figure 10:
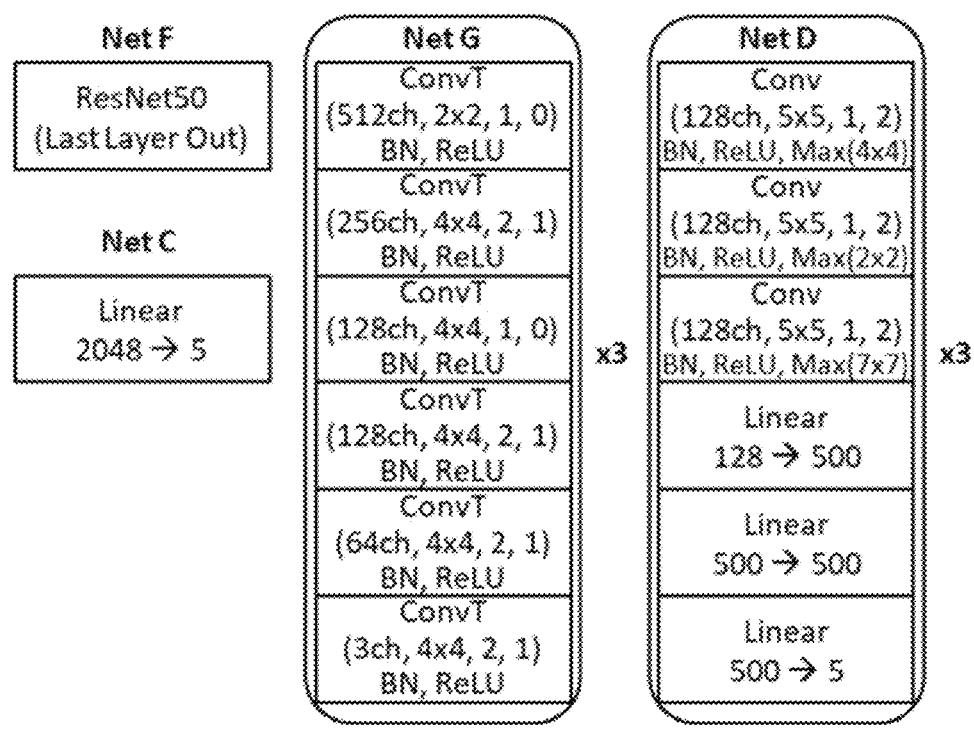
FIG. 10 depicts exemplary architectures for domain adaptation between aerial image dataset (AID) and the University of California, Merced (UCM) datasets according to various disclosed embodiments of the present disclosure.

The DAELF network's architecture for domain adaption may be tailored between AID and UCM. In particular, the Resnet-50 network with pre-trained weights may be used, the Resnet-50 network with the last layer removed may be used as netF, and one linear layer may be used as netC. FIG. 10 depicts exemplary architectures for domain adaptation between AID and UCM datasets according to various disclosed embodiments of the present disclosure. FIG. 10 illustrates the architectures of netF, netC, netG, and netD (replacing those of FIG. 4 with similar constructs of F, C, G, and D). Since the input image size for Resnet-50 is 224×224 pixels, both the AID and UCM images may be re-sized to 224×224 before feeding to the network.

DAELF may be developed as the method for domain adaptation and data fusion. To achieve optimal performance, different combinations of parameters may be explored by network training. The parameters and performance of 'source-only' and GTA modes are listed in Table 4. By choosing parameters properly, DAELF may be able to obtain significant improvement for the GTA mode when using the last trained model after 1000 epochs. Compared with the corresponding 'source-only' mode, the GTA accuracy can increase up to about 12%.

TABLE 4

| | | 1 | 2 | 3 | 4 | 5 |
|---|---|---|---|---|---|---|
| Parameters | Learning rate | 0.0004 | 0.0004 | 0.0004 | 0.0001 | 0.0004 |
| | Learning rate decay | 0.0002 | 0.0002 | 0.0002 | 0.0010 | 0.0010 |
| | Alpha | 0.05 | 0.01 | 0.08 | 0.05 | 0.05 |
| | Beta | 0.05 | 0.01 | 0.08 | 0.05 | 0.05 |

TABLE 4-continued

|  |  | 1 | 2 | 3 | 4 | 5 |
|---|---|---|---|---|---|---|
| Testing Accuracy | Source-only | 69.7 | 69.7 | 69.7 | 69.7 | 69.7 |
|  | Best GTA mode | 66.4 | 56.2 | 66.7 | 54.7 | 65.1 |
|  | Last GTA mode | 78.7 | 48.5 | 75.6 | 60.3 | 65.7 |

According to various embodiments of the present disclosure, the deep learning-based multi-source self-correcting DAELF method is provided to fuse data with different modalities at the data-level to maximize their capabilities to detect unanticipated events/targets. The DAELF deep neural network method may adapt to changes of the input distribution allowing self-correcting across multiple source classifications. When supported by a distributed computing hierarchy, the DAELF method may scale in data size, geographical span, and sensor modalities. From the aerial data sets analysis, FLF may outperform DLF in terms of classification accuracy. The results of the DAELF method may show that optimum performance can be achieved, which may reach or even exceed existing methods in common datasets. The performance of the DAELF method may depend on various hyper-parameters, each of which must be tuned to achieve optimum; and the optimization may be a sensitive process, requiring great attention and significant computational efforts.

Various embodiments of the present disclosure further provide a domain adaptation for efficient learning fusion (DAELF) device. The device includes a memory, configured to store program instructions for performing a DAELF method; and a processor, coupled with the memory and, when executing the program instructions, configured for: acquiring data from a plurality of data sources of a plurality of sensors; for each of the plurality of sensors, training an auxiliary classifier generative adversarial network (AC-GAN) by a hardware processor, where the AC-GAN includes a feature extraction network, a label prediction network, a generator network, and a discriminator network, with data from each data source of the plurality of data sources, thereby obtaining a trained feature extraction network and a trained label prediction network for each data source; using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network; training the decision-level fusion network or the feature-level fusion network with a source-only mode or a generate to adapt (GTA) mode; and applying the trained decision-level fusion network or the trained feature-level fusion network to detect a target of interest.

Various embodiments of the present disclosure further provide a non-transitory computer-readable storage medium, containing program instructions for, when being executed by a processor, performing a domain adaptation for efficient learning fusion (DAELF) method, the method including: acquiring data from a plurality of data sources of a plurality of sensors; for each of the plurality of sensors, training an auxiliary classifier generative adversarial network (AC-GAN) by a hardware processor, where the AC-GAN includes a feature extraction network, a label prediction network, a generator network, and a discriminator network, with data from each data source of the plurality of data sources, thereby obtaining a trained feature extraction network and a trained label prediction network for each data source; using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network; training the decision-level fusion network or the feature-level fusion network with a source-only mode or a generate to adapt (GTA) mode; and applying the trained decision-level fusion network or the trained feature-level fusion network to detect a target of interest.

The embodiments disclosed herein may be exemplary only. Other applications, advantages, alternations, modifications, or equivalents to the disclosed embodiments may be obvious to those skilled in the art and be intended to be encompassed within the scope of the present disclosure.

What is claimed is:

1. A domain adaptation for efficient learning fusion (DAELF) method, comprising:
    acquiring data from a plurality of data sources of a plurality of sensors;
    for each of the plurality of sensors, training an auxiliary classifier generative adversarial network (AC-GAN) by a hardware processor, wherein the AC-GAN includes a feature extraction network, a label prediction network, a generator network, and a discriminator network, with data from each data source of the plurality of data sources, thereby obtaining a trained feature extraction network and a trained label prediction network for each data source;
    using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network;
    training the decision-level fusion network or the feature-level fusion network with a source-only mode or a generate to adapt (GTA) mode, wherein:
        at the source-only mode, the trained feature extraction network for each data source and the corresponding centralized fusion network are trained with labeled source data, and
        at the GTA mode, the trained feature extraction network for each data source and the corresponding centralized fusion network are trained separately, wherein the trained feature extraction network for each data source is trained with the labeled source data and unlabeled target data; and the corresponding centralized fusion network is trained with the labeled source data only; and applying the trained decision-level fusion network or the trained feature-level fusion network to detect a target of interest.

2. The method according to claim 1, wherein training the AC-GAN includes:
   inputting a source sample of the data from each data source into the feature extraction network for each data source to generate an embedding feature used by both the label prediction network and the generator network for each data source; and
   inputting a target sample of the data from each data source into the feature extract network for each data source to generate an embedding feature only used by the generator network for each data source.

3. The method according to claim 1, wherein:
   at a training phase, for each data source, the AC-GAN has a stream 1, including the feature extraction network and the label prediction network, and a stream 2, including the feature extraction network, the generator network, and the discriminator network.

4. The method according to claim 1, further including:
   displaying the target of interest detected by the trained decision-level fusion network or the trained feature-level fusion network.

5. A domain adaptation for efficient learning fusion (DAELF) device, comprising:
   a memory, configured to store program instructions for performing a DAELF method; and
   a processor, coupled with the memory and, when executing the program instructions, configured for:
      acquiring data from a plurality of data sources of a plurality of sensors;
      for each of the plurality of sensors, training an auxiliary classifier generative adversarial network (AC-GAN) by a hardware processor, wherein the AC-GAN includes a feature extraction network, a label prediction network, a generator network, and a discriminator network, with data from each data source of the plurality of data sources, thereby obtaining a trained feature extraction network and a trained label prediction network for each data source;
      using the trained feature extraction network and the trained label prediction network for each data source on a sensor side, and a corresponding centralized fusion network on a fusion center side to form a decision-level fusion network; or
      using the trained feature extraction network for each data source on the sensor side and a corresponding centralized fusion network on the fusion center side to form a feature-level fusion network;
      training the decision-level fusion network or the feature-level fusion network with a source-only mode or a generate to adapt (GTA) mode, wherein:
         at the source-only mode, the trained feature extraction network for each data source and the corresponding centralized fusion network are trained with labeled source data, and
         at the GTA mode, the trained feature extraction network for each data source and the corresponding centralized fusion network are trained separately, wherein the trained feature extraction network for each data source is trained with the labeled source data and unlabeled target data; and the corresponding centralized fusion network is trained with the labeled source data only; and
      applying the trained decision-level fusion network or the trained feature-level fusion network to detect a target of interest.

6. The device according to claim 5, wherein training the AC-GAN includes:
   inputting a source sample of the data from each data source into the feature extraction network for each data source to generate an embedding feature used by both the label prediction network and the generator network for each data source; and
   inputting a target sample of the data from each data source into the feature extract network for each data source to generate an embedding feature only used by the generator network for each data source.

7. The device according to claim 5, wherein:
   at a training phase, for each data source, the AC-GAN has a stream 1, including the feature extraction network and the label prediction network, and a stream 2, including the feature extraction network, the generator network, and the discriminator network.

8. The device according to claim 5, wherein the method further includes:
   displaying the target of interest detected by the trained decision-level fusion network or the trained feature-level fusion network.

9. A non-transitory computer-readable storage medium, containing program instructions for, when being executed by a processor, performing a domain adaptation for efficient learning fusion (DAELF) method, the method comprising:
   acquiring data from a plurality of data sources of a plurality of sensors;
   for each of the plurality of sensors, training an auxiliary classifier generative adversarial network (AC-GAN) by a hardware processor, wherein the AC-GAN includes a feature extraction network, a label prediction network, a generator network, and a discriminator network, with data from each data source of the plurality of data sources, thereby obtaining a trained feature extraction network and a trained label prediction network for each data source;
   using the trained feature extraction network and the trained label prediction network for each data source on a sensor side, and a corresponding centralized fusion network on a fusion center side to form a decision-level fusion network; or using the trained feature extraction network for each data source on the sensor side and a corresponding centralized fusion network on the fusion center side to form a feature-level fusion network;
   training the decision-level fusion network or the feature-level fusion network with a source-only mode or a generate to adapt (GTA) mode, wherein:
      at the source-only mode, the trained feature extraction network for each data source and the corresponding centralized fusion network are trained with labeled source data, and
      at the GTA mode, the trained feature extraction network for each data source and the corresponding centralized fusion network are trained separately, wherein the trained feature extraction network for each data source is trained with the labeled source data and unlabeled target data; and the corresponding centralized fusion network is trained with the labeled source data only; and
   applying the trained decision-level fusion network or the trained feature-level fusion network to detect a target of interest.

10. The storage medium according to claim 9, wherein training the AC-GAN includes:

inputting a source sample of the data from each data source into the feature extraction network for each data source to generate an embedding feature used by both the label prediction network and the generator network for each data source; and inputting a target sample of the data from each data source into the feature extract network for each data source to generate an embedding feature only used by the generator network for each data source.

11. The storage medium according to claim 9, wherein:

at a training phase, for each data source, the AC-GAN has a stream 1, including the feature extraction network and the label prediction network, and a stream 2, including the feature extraction network, the generator network, and the discriminator network.

12. The storage medium according to claim 9, wherein the method further includes:

displaying the target of interest detected by the trained decision-level fusion network or the trained feature-level fusion network.

\* \* \* \* \*